Aug. 17, 1954  D. M. WROUGHTON ET AL  2,686,864
MAGNETIC LEVITATION AND HEATING OF CONDUCTIVE MATERIALS
Filed Jan. 17, 1951  4 Sheets-Sheet 1
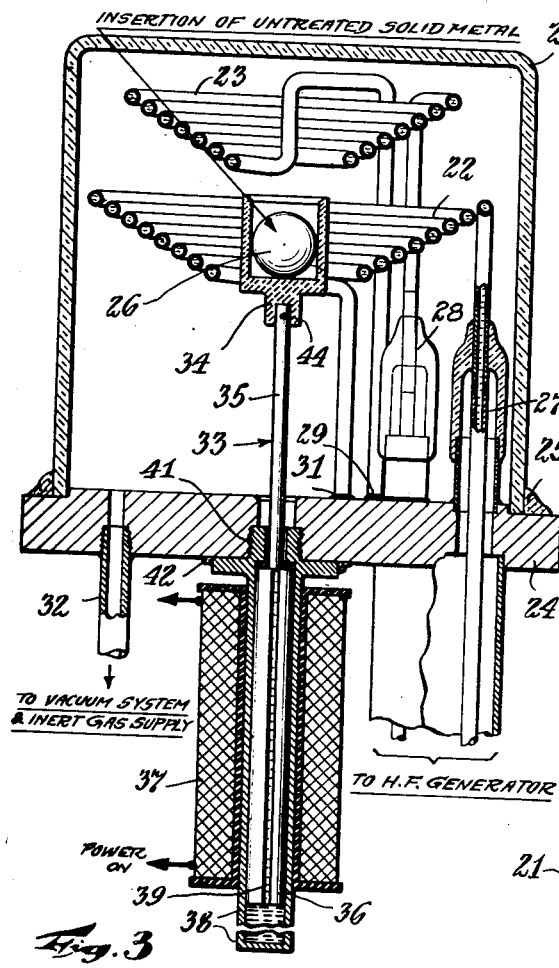
Fig. 1. INSERTION OF UNTREATED SOLID METAL
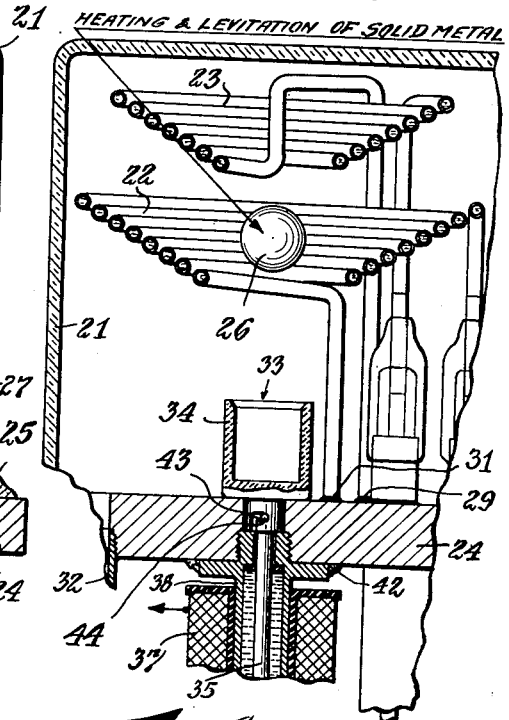
Fig. 2. HEATING & LEVITATION OF SOLID METAL
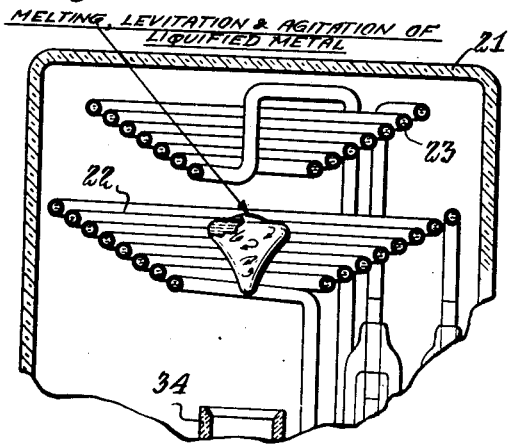
Fig. 3. MELTING, LEVITATION & AGITATION OF LIQUIFIED METAL
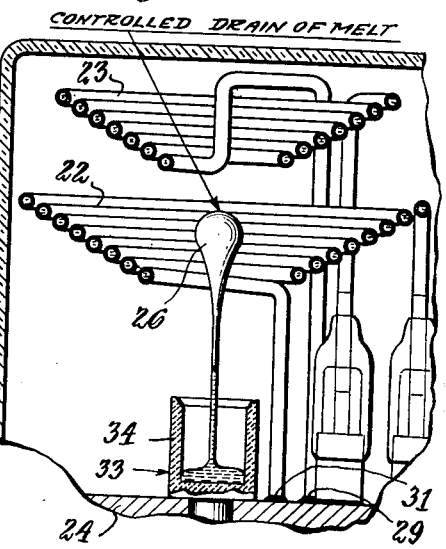
Fig. 4. CONTROLLED DRAIN OF MELT
INVENTORS
D. M. WROUGHTON
E. C. OKRESS
BY
ATTORNEY Aug. 17, 1954  D. M. WROUGHTON ET AL  2,686,864
MAGNETIC LEVITATION AND HEATING OF CONDUCTIVE MATERIALS
Filed Jan. 17, 1951

INVENTORS
D. M. WROUGHTON
E. C. OKRESS.
BY
ATTORNEY

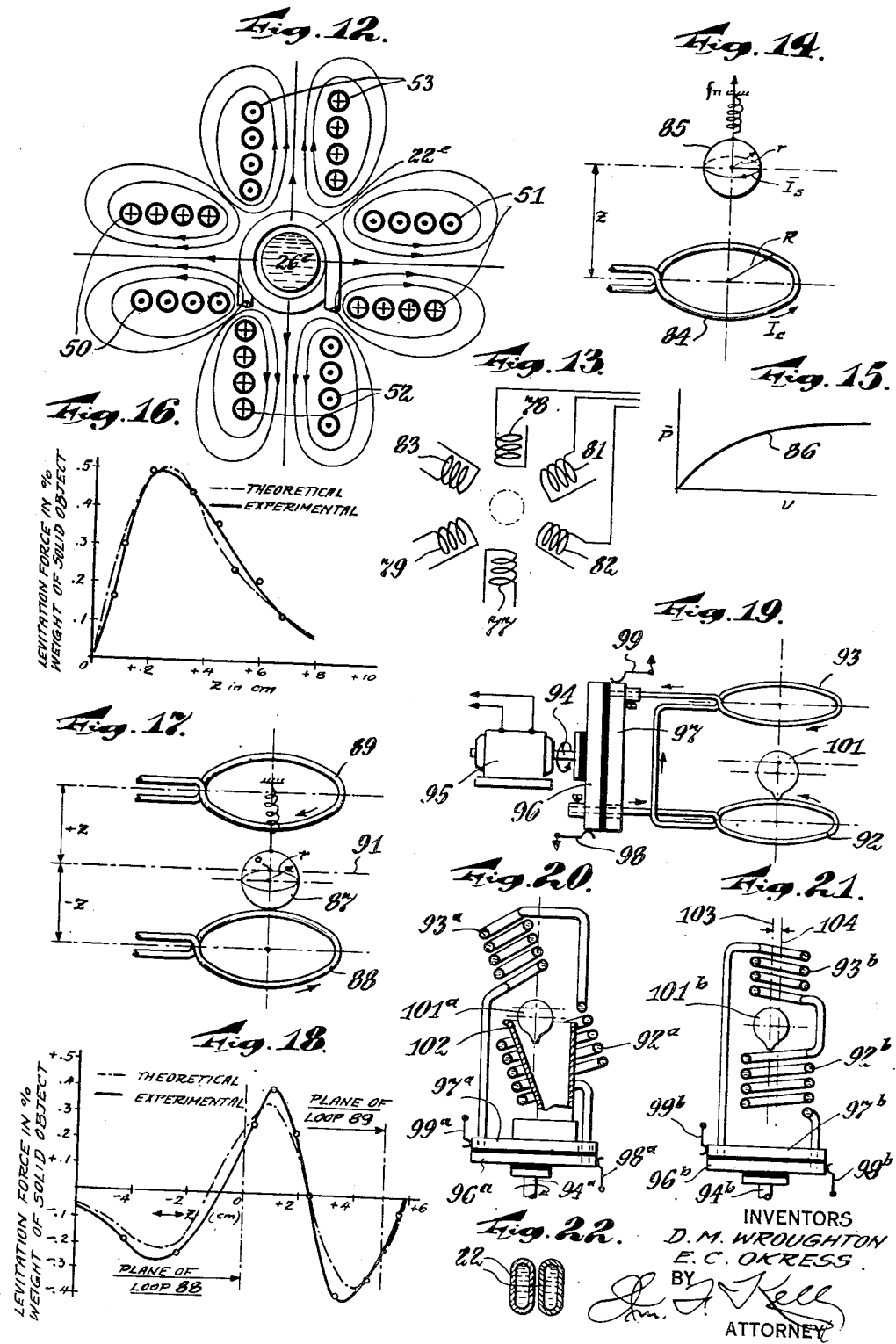

Aug. 17, 1954 D. M. WROUGHTON ET AL 2,686,864
MAGNETIC LEVITATION AND HEATING OF CONDUCTIVE MATERIALS
Filed Jan. 17, 1951 4 Sheets-Sheet 4
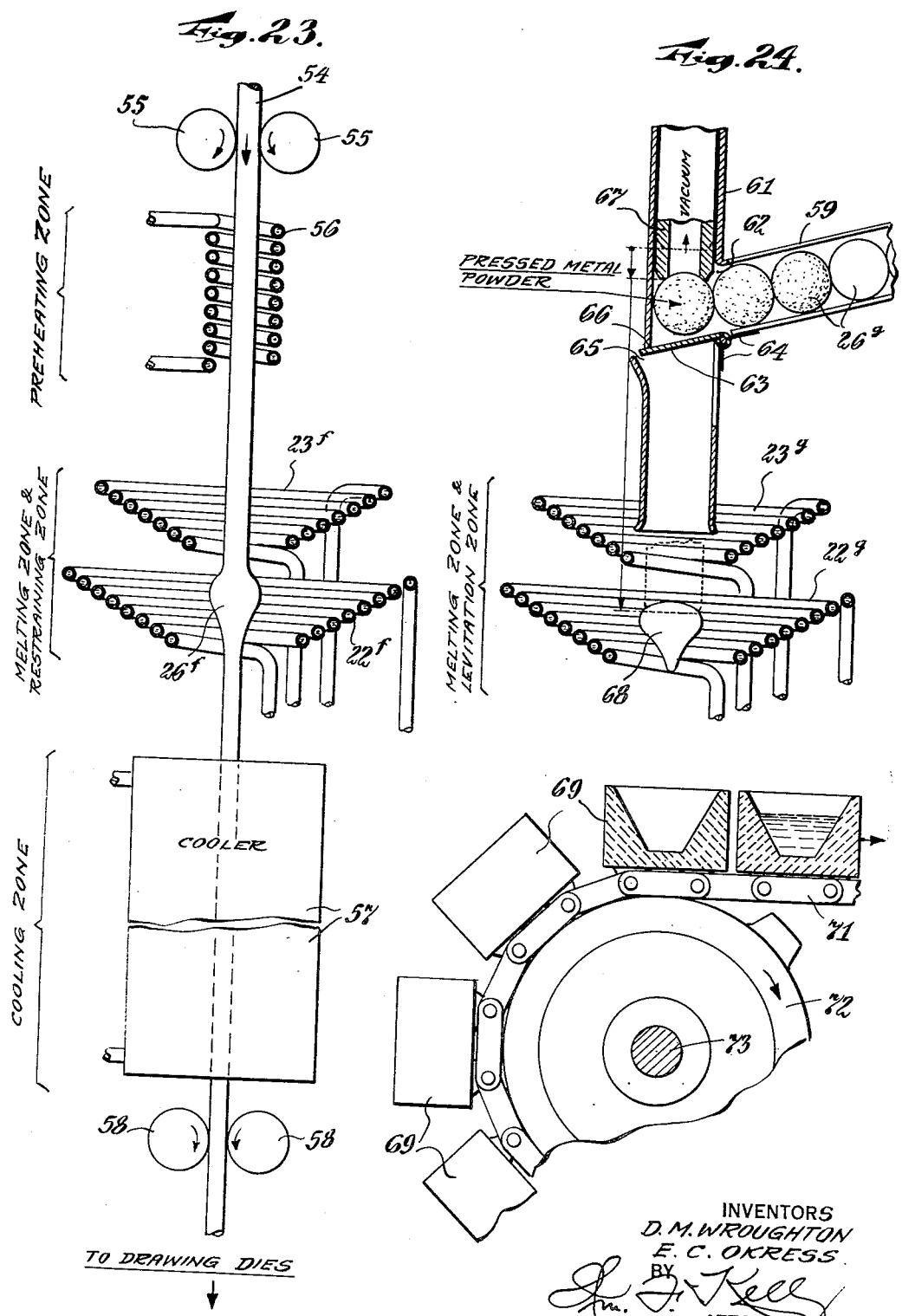
INVENTORS
D. M. WROUGHTON
E. C. OKRESS
BY
ATTORNEY Patented Aug. 17, 1954

2,686,864

UNITED STATES PATENT OFFICE 2,686,864

MAGNETIC LEVITATION AND HEATING OF CONDUCTIVE MATERIALS

Donald M. Wroughton, Pittsburgh, Pa., and Ernest Carl Okress, Montclair, N. J., assignors to Westinghouse Electric Corporation, East Pittsburgh, Pa., a corporation of Pennsylvania Application January 17, 1951, Serial No. 206,344

21 Claims. (Cl. 219—1)

This invention relates to heating and/or melting of electrically conductive materials in any form and shape while levitated by a properly distributed alternating magnetic field or fields in air, vacuum or inert gas atmosphere, without a confining container or crucible. The required levitating field may be obtained by various configurations of coils. The frequency of the alternating magnetic field is preferably such that relatively thin skin depth of field penetration occurs in the conductive object.

The principal object of our invention, generally considered, is to provide apparatus for heating conductive materials, comprising at least one, but preferably a system of electrical circuits or coils, means for supplying alternating magnetic fields, whereby a conductive object interposed between the coils on the common axis thereof may be levitated thereat by the alternating current fields, and means for moving such an object into the influence of said fields whereby it may be levitated and heated to the desired extent, out of contact with a potentially contaminating crucible or other container at the elevated temperature involved.

Another object of our invention is to avoid contamination of metal during melting, by levitating the metal to be melted in air, in vacuum, or in an inert environment, by means of an alternating magnetic field or alternating magnetic fields varying in accordance with current producing it or them.

A further object of our invention is to produce an alternating field so distributed that metal to be melted in it does not touch any enclosure, and while so levitating the metal, if desired, melting it by power derived from the alternating field produced by the surrounding or adjacent circuit or coils.

A still further object of our invention is to supply heat to conductive materials, especially metals, by the use of liquid-cooled conductors or coils which carry alternating current, preferably employing two spaced coaxial systems of coils with fields therefrom in mutual opposition, in order to provide a restoring force on the material levitated therebetween and stabilize the levitation of the material being heated.

Another object of our invention is to levitate and simultaneously melt metal by means of one or more alternating magnetic fields produced by coils carrying alternating current, generally of high frequency, by which is meant a frequency at which the amplitude of the electric vector is equal to 1/ε of its value at the surface and the phase lags π radians at a depth below said surface which is small compared with the dimensions of the material levitated, and then reducing the field slowly so as to funnel or drop the metal into a mold without resort to material guides.

A further object of our invention is to provide apparatus for levitating and melting metals, involving opposing fields formed by two spaced coaxial coils in which currents flow in opposite directions in the two coils connected in series, or as an alternative in parallel to the same source.

A still further object of our invention is to provide for the more effective levitation of material to be heated and/or melted in alternating current fields, by rotating or scanning the fields, either mechanically or electrically by the use of multiple phase connections and source.

An additional object of our invention is the formation of alloys by melting the matrix metal, while levitated by alternating fields as before described, and then feeding the more volatile metal into the melted matrix, whereby the inherent strong agitation resulting from the fields promotes rapid thorough mixing, so that the alloy forms quickly with minimum losses.

Other objects and advantages, relating to the particular arrangement and the construction of the various parts, will become apparent as the description proceeds.

Referring to the scale drawings:

Figure 1 is a vertical sectional view of apparatus for producing alternating current fields, in air, a vacuum, or an inert atmosphere, for levitating conductive material to be melted and/or heated, together with means for raising supporting means for such material to a position between two coaxial coil systems where the fields will exert the desired levitation, and then withdrawing the supporting means immediately.

Figure 2 is a fragmentary vertical sectional view corresponding with Figure 1, but showing a subsequent position where the supporting means has been withdrawn, leaving the material to be heated levitated by the opposing alternating fields produced by the two coaxial coil systems.

Figure 3 is a fragmentary view corresponding with Figure 2, but showing a subsequent position where the suspended material has been melted.

Figure 4 is a fragmentary view corresponding with Figure 3, but showing a subsequent position where the field strength has been reduced sufficiently to allow the levitated molten material to drain into the cavity portion of the supporting means which was used initially to raise it to an axial position between the coils. It should be noted that the molten metal may be dropped or slowly funneled by the fields when the latter are properly adjusted for such process, and that no material vessel is required to do the job.

Figure 5:
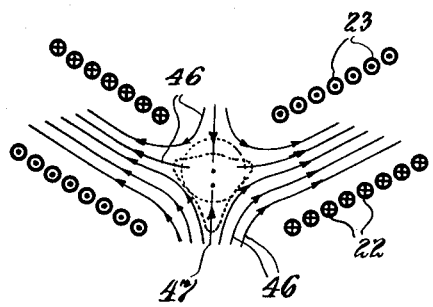

Figure 5 is a fragmentary vertical sectional view, diagrammatic, to illustrate some of the principles of our invention.

Figure 6:
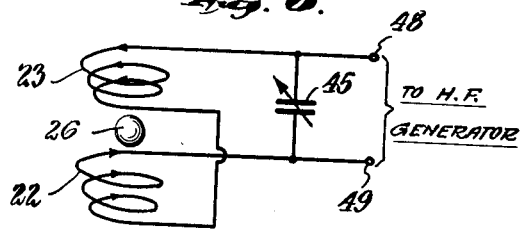

Figure 6 is a diagrammatic view showing circuits involved in the practice of our invention.

Figure 7:
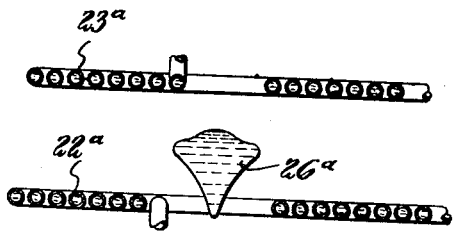

Figure 7 is a fragmentary vertical sectional view corresponding to Figure 3, but showing different forms of coils.

Figure 8:
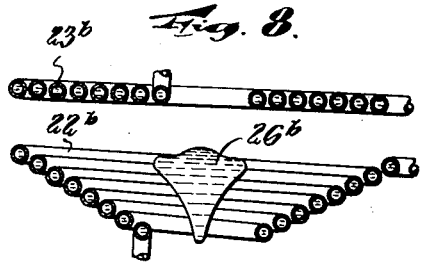

Figure 8 is a view corresponding to Figure 7, but showing still different forms of coils.

Figure 9:
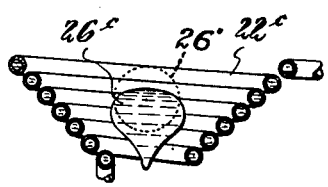

Figure 9 is a view corresponding to Figure 8, but showing that it is possible to support material to be heated or melted by means of a single coil therebeneath.

Figure 10:
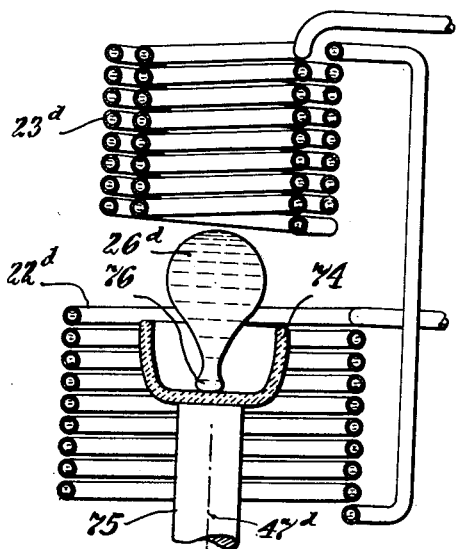

Figure 10 is a view corresponding to Figure 8, but showing still another embodiment of our invention.

Figure 11:
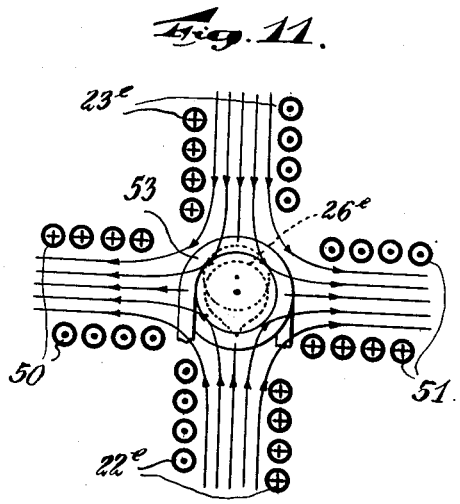

Figure 11 is a vertical sectional view corresponding to Figure 10, but showing the employment of multiple (six) coils for improving the levitation of material to be heated and subsequently melted, preferably employing a plurality of phases so as to cause rotation of the supporting fields.

Figure 12 is a view of the apparatus of Figure 11, but in horizontal instead of vertical section.

Figure 13 is a diagrammatic view corresponding to Figure 11, but showing the use of all six coils with their axes in a common vertical plane, particularly adapting them for use with three phase alternating current.

Figure 14 is a diagram for use in explaining the principles of levitation by means of an alternating magnetic field.

Figure 15 is a graph showing how the power absorbtion by conductive object varies with the frequency.

Figure 16 is a graph showing how the levitation force varies with distance from a single levitating coil.

Figure 17 is a diagram for explaining the principles of levitation using a coil above, as well as one below, the conductive object.

Figure 18 is a graph showing the variation in the levitating and restoring force on a conductor in a field between coils as shown in Figure 17.

Figure 19 is a diagram of apparatus which may be used for producing mechanically the effect of a rotating or scanning field.

Figure 20 is a diagram showing how the effect of a scanning field is produced by mechanically rotating, about a vertical axis, coils carrying alternating current and whose common axis is diagonal.

Figure 21 is a view corresponding to Figure 20, but showing the scanning effect of such levitating coils when their common axis is vertical, but the axis of rotation is offset with respect to said coil axis.

Figure 22 is an enlarged sectional view of the metal tubing forming the coils of all forms of the invention, showing how closer spacing of the turns of said coils is effected by flattening, or forming the tubing oval rather than circular in section.

Figure 23 is a diagrammatic vertical sectional view of apparatus for treating continuously a rod as it is extruded or pressed, through pre-heating, sintering, melting if desired, cooling, and drawing.

Figure 24 is a diagrammatic vertical sectional view showing apparatus for treating spheres, right circular cylinder, or slugs of pressed metal powder, which may involve melting said spheres and casting them in chain-carried molds therebeneath.

In melting metals, particularly in melting the more reactive high-melting-point metals, such as titanium, zirconium, vanadium, tantalum, molybdenum and other metals of similar chemical and physical characteristics, difficulty is usually encountered in the selection of crucible materials. When such metals are melted they react with the material of the crucible to some extent, or other reactions occur which adversely affect the quality of the melt. For example, titanium, when melted in a graphite crucible, may contain several tenths to 1% or more of carbon. When zirconium is melted in contact with beryllium oxide, it becomes embrittled because of absorbing oxygen from the refractory. When molybdenum is melted in a crucible of water-cooled copper, the ingot thereafter formed has a very rough surface and often possesses holes or voids.

In order to overcome such difficulties, we have devised a novel method wherein such metal is heated and melted out of contact with any solid material with which it might react, whereby no refractory crucibles are necessary to hold the metal for melting. The invention comprises levitating the metal to be melted in air, a vacuum or inert atmosphere confined by a suitable vessel, such as a quartz, or a 96% silica glass bell jar manufactured by the Corning Glass Works under the name "Vycor," by means of an alternating magnetic field or fields.

The levitating magnetic fields are so distributed between, for example, two coaxial coils, that the metal to be melted does not touch any supporting material and, while so levitating the metal, melting it by alternating current energy from the surrounding coil system. The levitating magnetic field is preferably supplied by the same coil system which provides the high frequency electrical energy for heating and melting the levitated material. Besides keeping the metal out of contact with any material which might react therewith and contaminate the melt, volatile materials which may vaporize from the metal when it is melted, will condense upon the walls of the confining vacuum or inert gas vessel and not again contaminate the metal upon cooling.

Now referring to the drawings illustrating embodiments of our invention, and first considering that of Figures 1 to 6, inclusive, there is shown a bell jar 21 formed large enough, if this is convenient, to enclose coils 22 and 23, which are to be used for levitating conductive material or metal to be melted or heated. This jar rests on a preferably metal base 24 and may be sealed gas- or vacuum-tight thereto, preferably by means of suitable wax 25.

In the present embodiment, the coils 22 and 23, desirably of copper tubing (conveniently of ¼ dia.) flattened to facilitate close coiling, as shown in the detail of Figure 22, although drawn unflattened to avoid drafting difficulties, are helically coiled into frusto-conical formation, as illustrated. The outside diameter of the lower coil 22 is larger than that of upper coil 23, in order to more effectively stabilize the support of the mass 26 of metal or other conductive material to be heated. Alternating current is supplied to the coils 22 and 23 by means of coaxial lines or cables 27 and 28, respectively extending to one end of each coil, the other ends being supportingly connected to and through the efficiently conducting base 24, as indicated at 29 and 31.

The enclosure provided by the bell jar 21, and the supporting base 24, may be evacuated through pipe 32 and, if desired, thereafter supplied with inert gas thereby. In order to place the mass 26 of metal, here shown generally spherical, into the influence of the supporting and heating coils 22 and 23, we have provided a lifting device 33. Said device comprises a cup 34, desirably formed of low-loss material or alumina and of a size sufficient to hold the material to be subsequently levitated and heated, connected to the upper end of a rod 35, the lower end of which is connected to the armature 36 of a solenoid 37. The armature 36 reciprocates in an oil-containing cylinder 38, and is provided with one or more grooves 39 therealong, so that the oil in said cylinder leaks thereby during operation, exerting a dash-pot action and preventing jerky operation. The cylinder is desirably threadably connected to the lower portion of the base 24, as indicated at 41, and sealed thereto by means of suitable wax 42. The cup 34 may be detachably connected to the upper end of the rod 35 by having a bayonet slot 43 engaging an outstanding pin 44 on said rod.

In order to effect heating or melting of the material, using the apparatus of Figures 1 to 4, inclusive, material 26 is placed in the cup 34 while the bell jar 21 is removed. This may be done either when the cup is elevated, as upon energization of the solenoid 37, as shown in Figure 1, or when the cup is lowered and shown in Figure 2 upon deenergization thereof. After this has been accomplished the bell jar may be placed in position, as shown in Figure 1, and sealed to the base by the wax 25. The space inside the jar 21, may then be evacuated through pipe 32, and said vacuum either maintained or the exhausted air replaced by inert gas, such as argon, nitrogen, or other gas not reactive with the material to be heated.

If the cup 34 is initially in the position of Figure 2, power is then applied to energize the solenoid 37 and raise said cup to the position of Figure 1, where the matter therein will be under the influence of the magnetic fields to be generated by the coils 22 and 23. High frequency or other alternating current is then supplied to the coils 22 and 23 to create a field of such nature and magnitude, that upon lowering the cup 34, the metal mass or sphere 26 stays in place in the field as shown in Figure 2. Alternating current, usually of high frequency, is needed for simultaneous levitation, heating and melting the conductive material 26. The frequency is such that the resultant skin depth in the material is a small fraction of the dimension of the material. The two coils 22 and 23 may be connected in series in such a way that the fields produced thereby are in opposition, that is, so that current always flows around the helix of the top coil in one direction, and through the bottom coil in the opposite direction. A variable condenser bank 45, shown diagrammatically in Figure 6, is connected across the two coils, as shown, so that the power factor may be adjusted as desired.

The coil-condenser combination may be powered from a 50 kva., 10,000 cycle generator. The voltage on the leads to the generator is substantially the voltage across the coils, but the current readings in the line will be smaller than the circulating current in the coils, because of the resonance effect of the parallel condenser coil combination.

With a preferred spacing between the coils 22 and 23, of about 1¼" for a particular case and generator output readings of about 200 volts, 25 amps., a piece of aluminum roughly spherical, about 1¼" in diameter, and weighing about 60 grams, was raised to the position shown in Figure 2, and remained suspended as illustrated, supported by the high frequency field and without solid support or restraint of any other physical kind. Theoretically, the restoring force on the levitated material will maintain it at an equilibrium position between the coils, on or near the common axis as shown. Actually the piece resisted any effort to move it in any direction away from said equilibrium position.

With the metal suspended as indicated in Figure 2, continued operation of the system caused heating of the metal by induction, the same current which provided the supporting field also serving to heat the piece. After a few minutes, with the power setting noted, the metal started to melt. As it melted, it assumed and maintained the shape like a top, illustrated in Figure 3, with the tip of the molten matter reaching downward toward the center of the lower turn of the lower coil. When it is desired to remove the molten metal from the field, it is merely necessary to decrease the strength of the field, whereupon the metal will drain into the cup 34, therebelow, as shown in Figure 4. This drain may be at a controlled rate in accordance with the variation in the field strength. No physical confining funnel or vessel is needed to drain the molten levitated metal. As an alternative, the field strength may be reduced merely enough to allow the metal to solidify, while still supported by the field. Also, the field may be reduced quickly so as to permit the molten metal to drop as a whole.

In Figure 5 we have shown the type of field generated by the coils 22 and 23. From this it will be apparent that some lines of force 46 extend vertically up through the lower turn of the bottom coil, separating into two streams and passing diagonally outward and upward between the coils. Others pass vertically downward through the lower turn of the upper coil, separate into two streams and join the streams passing diagonally upward and outward between the coils from below. This means that there is a weak spot in the field immediately below and axially of the lower coil 22, as indicated at 47. Thus there is a tendency of a metal, when molten, to flow out axially of the coils at said weak spot. However, careful design considerations including the frusto-conical design of Figures 1 to 5, inclusive, eliminates undesired flow of molten metal from the coil's influence. The configuration and angles involved in multi-coil designs may be different for most effective support of solid as compared with that for molten metals. For example, tentative indications derived from initial experiments with double frusto-conical design of coils, are that a coil angle considerably less than that required for levitating the liquid metal is best for levitating the initially solid metal.

Figure 6 is merely a diagrammatic showing of how the coils 22 and 23 are to be connected to the poles 48 and 49, respectively, of the high-frequency generator (not shown).

Figure 7 shows a coil arrangement, alternative to that of Figures 1 to 6, inclusive. In this case the coils 22ª and 23ª are each flat and spiral in shape, rather than frusto-conical and helically spiral, as in the first form. Such coils may be used interchangeably with the coils 22 and 23, in apparatus such as shown in Figures 1 to 4, inclusive, and substantially the same results may be obtained. The metal when molten assumes the form indicated at 26ᵃ.

As a further alternative, coils 22ᵇ and 23ᵇ as shown in Figure 8 may be employed, the coil 22ᵇ corresponding in size and shape with the coil 22 of the first embodiment, and the coil 23ᵇ corresponding with the coil 23ᵃ of Figure 7. As in the first embodiment, the metal when molten assumes a shape such as indicated at 26ᵇ.

Although it is desirable to have an upper coil as well as a lower coil for supporting the metal prior to and after melting, yet it is possible to support it and melt a mass of metal with a single lower supporting coil indicated at 22ᶜ in Figure 9, provided said coil is shaped frusto-conical as there shown or when other alternatives to be discussed presently are resorted to. In such a case, the metal when molten drops slightly from the levitated position when solid, indicated as the dotted circle 26 and assumes a shape as indicated at 26ᶜ.

Referring now to the embodiment of our invention illustrated in Figure 10, there is shown a coil arrangement in which the lower coil 22ᵈ is cylindrically helical while the upper coil 23ᵈ is double cylindrically helical and with a diameter smaller than that of said lower coil. The coil arrangement here shown is not quite as good as that of the embodiment of Figures 1 to 4 inclusive, in that weak spot 47ᵈ is larger, and therefore the metal when molten may automatically discharge therefrom axially of the coils.

However, with such a coil arrangement, the metal, when solid, may be supported indefinitely, assuming sufficient power and a high enough frequency, and also assuming that the upper coil has a diameter smaller than that of the lower coil in order to provide the proper restraint. The metal when molten and in a condition incipient to discharge, assumes the shape indicated at 26ᵈ. The coils are shown connected in series, although it will be understood that they may properly be powered from independent sources or operated in parallel. By properly is meant that the circuit or coil configurations and magnitude of the alternating current in them and their mutual phases must be such that the resultant fields satisfy the conditions set forth in this invention.

Instead of attempting to hold the metal when molten in the field of Figure 10, the same may be collected as melted in a silica or other refractory low-loss dish 74, on the end of a supporting rod 75, when placed within the lower coil 22ᵈ. Such dish may also serve the purpose of the alumina cup 34 of Figures 1 to 4, inclusive. In doing this, the first metal which melted ran down from the supported piece 26ᵈ and touched the silica dish as indicated at 76. Thereafter the remainder of the metal was held in the field of the coil in the shape illustrated, even when completely melted. As the silica dish was lowered, the metal poured down along the lower tip or spout until it was all on the dish. Thus, it will be seen that the control of the metal, as melted, may be by means of a collecting device inserted axially up through the lower coil.

Referring now to the embodiment of our invention illustrated in Figures 11 and 12, there are shown three pairs of alternating field-producing coils. The designated 22ᵉ and 23ᵉ are, respectively, lower and upper coils such as shown in Figure 10; and those designated 50 and 51 are, respectively opposed coils lying with their axes horizontal, but preferably reinforcing the fields produced by the coils 22ᵉ and 23ᵉ, as shown by the lines of force illustrated in Figure 11. This reinforcing is desirable because if, as an alternative, the coils 50 and 51 oppose the field of the coils 22ᵉ and 23ᵉ, considerably less material 26ᵉ can be supported between said coils 22ᵉ and 23ᵉ for any given current supplied thereto.

To meet these conditions, adjacent horizontal coils, that is the coils 50 and 51 and the two coils 52 and 53 which lie between the coils 50 and 51, but are offset 90° in a horizontal plane, have been connected in opposition, so that the flux escapes between said offset coils, as shown by the lines of force illustrated in Figure 12, rather than passing from one horizontal coil to the next. The advantage of using such a coil combination in series on single phase high frequency power, is that a great spacing between the two vertical coils 22ᵉ and 23ᵉ is allowable, while maintaining a field which provides very stable levitation and more spherical shape of the molten material, than would be permissible with only one pair of coils of the same cross sectional area. However its greater complexity is a disadvantage.

The arrangement of Figures 11 and 12 is particularly adapted for multi-phase high frequency power with the attendant advantages in power generation and transmission. The three pairs of coils 22ᵉ—23ᵉ, 50—51, and 52—53, are connected, respectively to separate phases or to a single phase, of a suitable supply, as desired. The resultant rotative fields, if multiple phase power is used, conserves energy by reducing the effect of the weak spot or "hole" in the magnetic field through which molten metal sometimes tends to be discharged when the field strength is too near the value for discharge of the melt.

If, however, we use the coil arrangement otherwise as shown in Figure 11, but with the opposing coils 52—53 omitted, then we have a combination which may be operated on two-phase high frequency power, the coils 22ᵉ—23ᵉ (series-connected in opposition); 50—51 (series-connected in opposition), being respectively connected to the two phases, corresponding with the connections shown in Figures 265 and 266, pages 308 and 310, "A Course in Electrical Engineering," vol. II, Alternating Currents, Dawes, 4th edition, McGraw-Hill, 1947. Here again, effective rotation due to the phase differences will tend to prevent discharge of molten metal from the field when it is operated just above the value needed for discharging the melt in order to conserve energy.

In Figure 13 we show three pairs of opposing coils, 77, 78; 79, 81; 82 and 83. This arrangements differs from that of Figures 11 and 12 in that all have their axes in a single vertical plane, the axes of the coils 77 and 78 being vertical, while those of the coils 79, 81; 82 and 83 are diagonal. The coils are spaced with one another 60°, the members of each pair, 77 and 78, 79 and 81, and 82 and 83 are respectively series-connected in opposition, each pair across a different phase of a three phase power supply, while said pairs are, in turn, connected conventionally to a three-phase alternating current generator, corresponding with the connections shown in Figures 267 and 268, page 310, of "A Course in Electrical Engineering" previously referred to. In this way the fields produced by the coils are electrically caused to rotate about a horizontal axis, in accordance with well-known principles, similar to the fields in a three-phase alternating current induction motor. Only partial connections are shown in order to avoid complications in the illustrated wiring.

Figures 14 to 18 are for the purpose of illustrating some of the elementary principles involved in our invention, and a dissertation of these principles will now be given:

Stable magnetic levitation of a conducting object is achieved by placing it in a proper non-uniform alternating magnetic field of such frequency that it experiences an adequate restoring force which confines the object to a predetermined locality in the field. In such a case, the field, due to the eddy current of angular frequency $\omega$ (omega) in the object, considered as a sphere of radius $r$ for convenience, is equivalent to a loop of current, $\bar{I}_s (=Re I \epsilon^{jwt})$. The magnetic force, $\bar{f}$, on each elementary area $\overline{\alpha a}$ of this equivalent loop of current in a non-uniform magnetic field, $\bar{B}_c(=Re|B_c|\epsilon^{jwt})$, due to $\bar{I}_c$, is expressed as:

$$\bar{f} = \bar{I}_s \oint \overline{da} \times \bar{B}_c$$

In the above expressions, $Re$ denotes the real component; the vertical bars denote the magnitude of the vector; $\bar{B}_c$ denotes the magnetic induction or field; $\epsilon$ (epsilon) denotes the base of the natural system of logarithms; $j$ is a square root of minus 1; $\omega$ is $2\pi\nu$; $\nu$ (nu) is the frequency; $t$ is the time; $\oint$ denotes the cyclic or contour integral, $\overline{da}$ denotes a differential of area; $\bar{a}$ denotes area; $\bar{B}_c$ denotes the magnetic induction or field; and $I_c$ denotes the current. The bar over the letters denote the vector quantity, in contrast to a scalar. A vector quantity is one with both magnitude and direction, such as velocity; while a scalar quantity is one of magnitude only, such as temperature. The normalized quantity, or lifting force divided by weight, is referred to.

Referring now to Figure 14, there is shown a single loop of wire 84, of radius R, lying in a horizontal plane, and carrying an alternating current of $I_c$. Above and axially of this loop of wire, is positioned a sphere 85 of conducting material, such as metal, in which eddy current $I_s$ circulates due to induction, said sphere having a radius $r$. This conductive sphere is disposed a distance above the plane of the coil 84 equal to Z. It can be shown from the above equation, for the arrangement of Figure 14, that a normalized levitation force, $\bar{f}_n$, is exerted on the conductive sphere as illustrated by Figure 16.

Such a levitated conductive sphere of resistivity $\rho$ (rho) absorbs power from the alternating field $\bar{B}_c$, by virtue of the current density J in the elementary skin volume $dV$, according to the relation:

$$\bar{P} = \tfrac{1}{2}\rho \int\int\int |JJ*| dV$$

where $\int\int\int$ denotes volume integral and the asterisk denotes a conjugate quantity.

This average power absorption accounts for heating, and subsequent melting of the conductive sphere if enough of such power is supplied. It is related to the frequency of the alternating field $\bar{B}_c$ in accordance with the graph 86 shown in Figure 15.

Figure 16 shows how the levitating force, in percentage of weight of the object levitated, varies with distance above the supporting coil, the arrangement being such as shown in Figure 14. The data for plotting this curve was taken using a 1" diameter bronze sphere above a single loop of ¼" outside diameter copper tubing carrying water as a cooling medium. The loop was coiled to have a mean diameter of 4.85" and carried a current of 600 amps. at a frequency of 9.6 kilocycles. In getting the points on the experimental curve, the ball was supported by a spring and the elongations and contractions of said spring noted in order to determine the levitating forces.

It will be seen that the levitating forces so determined experimentally, agree quite closely with those determined by calculation from the theoretical aspect of the situation. In this experiment, however, the supporting effect was obviously not enough to actually levitate the sphere without external help, but it nevertheless shows the principle and that with such a field a conductive body can be levitated if sufficient current and/or number of turns on the coils are used. It will be interesting to note that the levitating force reaches a maximum when in a plane about 2.7 cm. above the plane of the coil, from a theoretical standpoint, and slightly lower then that as determined by experiment.

In order to obtain stable levitation we conceived of two spaced parallel coaxial circuit loops or coils, carrying alternating current in opposition as illustrated in principle by Figure 17. A conductive sphere 87 was placed between such coils 88 and 89, as illustrated in Figure 17. It will be noted from this figure that the sphere, if supported by a field of such strength, produced by alternating current in the coils 88 and 89, is not supported exactly midway between the planes of said coils, but below the midplane designated 91.

Figure 18 illustrates how the levitating force on the sphere 87 varies with its position with respect to the loops 88 and 89. In getting the data for this graph, a 1" diameter bronze sphere 87 was used, as in connection with the curve of Figure 16, the loops 88 and 89 being each formed of ¼" outside diameter copper tubing, water-cooled, each bent to a mean diameter of 4.85" and carrying 600 amps. of current at 9.6 kilocycles. As in the preceding instance, the levitating force was determined on the sphere 87 while spring suspended.

The curves in Figure 18 show why the sphere is supported stably between the two coils along the common axis. For if the object is for any reason displaced in any direction within the projected volume, between the two coils, restoring forces are exerted on the object to return it to its position of equilibrium therein. The form of the curves below the plane of the loop 88 conforms generally in shape with that of the graphs of Figure 16, except that said curves are reversed and start with a zero ordinate slightly below the plane of said lower coil 88, rather than in the plane because of the effect of the field produced by the coil 89 and object. The parts of the curves above the loop 89 are approximately the reverse of those below the loop 88.

In order to evaluate the levitation force $\bar{f}$, it is necessary to superimpose the individual forces on the conductive sphere, considering the skin currents therein equivalent whirl rings of current in the upper and lower hemispheres.

Although single turn current loops or turns are illustrated, multi-turn coils of flat, cylindrical, or frusto-conical configuration are equally applicable, as disclosed in connection with the embodiments of the Figures 1 to 12, inclusive. The power absorbed by conductive sphere 87 from the fields of two co-axial loops such as 88 and 89, can be derived from the previous expression. A similar variation of average power absorbed as a function of frequency is obtained.

Turning now to data obtained with practical forms of coils, consider an arrangement as shown in Figure 7, with the upper and lower flat spirals 23$^a$ and 22$^a$ with 1" diameter openings, each formed of 7 turns of ¼" outside diameter water-cooled copper tubing lying in planes spaced 1½" apart, for supporting an aluminum sphere 26$^a$, 1" in diameter, and weighing 21.5 grams. The circulating current in the spirals which was required to levitate the sphere was about 480 amperes.

The current readings in this and the subsequent examples denote circulating values taken with a Westinghouse current transformer and high frequency ammeter connected in the line between the coils of the examples and condensers in circuit with said coils as in Figure 6. The turns ratio or multiplication factor of the transformer in the present instance was 60. This means that in the present instance a reading of 8 amperes meant that 480 amperes were circulating in opposition in the spirals 23$^a$ and 22$^a$.

The power supplied by the generator was about 9 kilowatts, at a frequency of about 10 kilocycles/sec. With such a frequency ($\nu$), the skin depth for aluminum amounts to approximately $\frac{1}{32}$" (8.26/$\sqrt{\nu}$cm.)

It is defined as the normal distance in the conductor from the surface at which the amplitude of the electric vector is $1/\epsilon$ of its value at the surface, and at this distance, the phase lags $\pi$ radian.

The metal was levitated even after completely molten for as long a time as desired, while maintaining the shape illustrated. A tendency for the metal to spin was shown, but this could be stopped mechanically. Agitation occurred in the molten metal. When the circulating current was decreased to 312 amps., the molten metal was drained under control of the current out into a vessel therebeneath. This melting was repeated several times with the same results. Using a 1½" diameter aluminum sphere weighing about 70 grams, similar result was obtained, but 570 amps. circulating current at 10 kilocycles/sec. was used to effect levitation, and controlled drainage occurred when the circulating current was reduced slowly to 360 amps.

With an arrangement such as shown in Figure 8, we used 7 turns of ¼" outside diameter copper tubing in each of the coils 23$^b$ and 22$^b$ and cooled them by water. The conical angle subtended by the turns of the coil 22$^b$ was 120°, and the distance between the plane of the coil 23$^b$ and that of the lower turn of the coil 22$^b$ was 1½", with a 1" opening in the centers of both of said coils. Using an aluminum sphere 1" in diameter weighing 21.5 grams, the levitating circulating current necessary was 630 amps. at a frequency of 10 kilocycles/sec., when the currents in the two coils were in opposition. The stability of levitation of both solid and molten metal with this coil combination was improved, as compared with that of Figure 7.

With generally circular, although slightly spiral, coils 22 and 23 arranged as in Figure 1, using 7 turns of ¼" outside diameter water-cooled copper tubing for both of said coils, with the conical angle 120°, the distance between planes of the coils 1½", and 1" openings through the lower turns of each coil, a solid 1" diameter aluminum sphere weighing 21.5 grams was supported when circulating current of 426 amps. at a frequency of 10 kilocycles/sec. was passed through the coils in opposition to one another. This was with a 8.1 kilowatt input to the circuit and provided good stable levitation of both solid and molten metal.

Although in all forms, the coils are, for convenience, shown generally circular or spiral in plan, or cylindrically helical, we contemplate other forms, such as those generally square or otherwise polygonal in plan, or prismatically helical.

Although a conductive sphere was considered for simplicity, other conductive forms may be used with effectiveness. The previous comments hold for magnetic solids as well as non-magnetic solid or molten objects. The inherent agitation of the molten matter of the levitated object is due to the thermal and electrical forces therein. Although from 20 to 550 grams of metals such as copper, brass, tin, and pressed titanium powder were successfully levitated and heated in the alternating magnetic fields, obtained by various configurations of coils, most of the work was done initially with small aluminum spheres for convenience, economy and within the limitations of availablie power supply. Later other metals of much greater weight were successfully levitated and heated to the desired degree.

Although we have illustrated for simplicity hollow coils, circular in section, yet it is preferred to flatten such coils so that they may be positioned closer to one another and thereby improve efficiency and coupling to the levitated object. It can be shown, on the basis of equivalent circuit theory, that the efficiency of power conversion, from a coil to a heated conductive object for a fixed position within the coils, is of the order of:

$$\frac{\frac{Q_s^2}{Q_s^2+1}\left(\frac{M}{L_s}\right)^2 R_s}{R_p+\frac{Q_s^2}{Q_s^2+1}\left(\frac{M}{L_s}\right)^2 R_s}$$

where the subscripts $p$ and $s$, respectively denote the primary circuit or coil and the equivalent secondary circuit of the heated conductive object, while R, L and M denote the effective resistance, self inductance and mutual inductance of the equivalent circuits involved. Finally, the equivalent $$Q_s = \frac{\omega L_s}{R_s}$$

where $\omega$ denotes the angular frequency.

On this equivalent circuit basis, the power absorbed by the load is of the order of:

$$\left(\frac{M}{L_s}\right)^2 I^2 R_s \text{ watts}$$

where I denotes the root mean square value of coil current.

An analysis of these expressions reveals that
(a) The effective resistance of the coil should be a minimum.
(b) The coupling between the coil and heated conductive object should be a maximum consistent with the requirement of stable and efficient levitation. This requirement is limited by coil and tubing diameter, and spacing between turns of the coil. It is desirable to flatten the copper tubing of the coil and insert thin mica spacers between the turns.

(c) The field should be as uniform as possible consistent with the requirement of efficient stable levitation.

Referring now to the embodiment of our invention illustrated in Figure 19, there is shown a pair of single turns of wire 92 and 93 connected in series so as to produce fields in opposition, as in the arrangement of Figure 17. These coils are mounted for rotation about the axis of the shaft 94 of a motor 95. While being turned they receive alternating current through slip rings 96 and 97 and the respective contacts 98 and 99. These coils may serve to exert levitating force on a conductive object 101, in a position agreeing with that of the object 87 of Figure 17, whether the coils 92 and 93 are stationary and positioned as in Figure 19, or rotated by the motor 95. They will also serve to support the object 101 if the coils are stationary but turned 90° from the position of Figure 19. However, in this position the object would be supported above the axial plane of said coils, rather than below the midplane between said coils, as has been determined by trial as well as computation. When the coils are mechanically rotated as by the motor 95 illustrated, an effect is produced similar to the multiphase operation using coils as in Figure 13, for example, in which the rotation is electrical rather than mechanical.

Referring now to the embodiment of our invention illustrated in Figure 20, there is shown a pair of coils 92$^a$ and 93$^a$ connected in series so as to produce fields in opposition, generally as in the arrangement of Figure 10. However, these coils differ from that of Figure 10 in that while both are helically coiled to cylindrical form, the coil 93$^a$ is not doubled like the coil 23$^d$, and the common axis of the coils instead of being normally vertical is inclined. A further distinction resides in the fact that provision is made for rotating these coils while being energized in opposition by alternating current through slip rings 96$^a$ and 97$^a$, on which they are mounted, and the respective contacts 98$^a$ and 99$^a$. These coils are mounted for rotation about the axis of the shaft 94$^a$ of a motor (not shown) and serve for levitating a conductive object 101$^a$ therebetween.

These coils are not adapted to efficiently exert levitating force on said object, except while being rotated, because the supporting force due to the generated fields is not vertical but inclined to the desired degree. For this reason, there is a preferably low loss alumina cup 102 provided and mounted for support above ring 97$^a$ for turning therewith. Said cup is of the shape illustrated for preventing the matter of the object 101$^a$ when molten from falling on the coils, and directing it into the bottom of the cup when the levitated object is drained from the field between coils by decreasing the current thereto.

It will be apparent that when the coils are rapidly rotated, the effect of a scanning field is attained as the rotation effects a mechanical scanning action, resulting in more efficient supporting field, due to the virtual reduction of the effect of the weak central spot under the molten metal normally occurring when a stationary lower conductor, wound helically to cylindrical formation as in Figure 10, is employed.

Referring now to the embodiment of our invention illustrated in Fig. 21, there is shown a somewhat similar coil arrangement involving a lower helical coil 92$^b$ wound to cylindrical form and an upper helical coil 93$^b$ of slightly smaller diameter but also wound helically to cylindrical form. These two coils are connected in series so that the fields produced thereby oppose one another for supporting a conductive object 101$^b$ therebetween. As in the preceding embodiment, these coils are mounted for rotation about an axis eccentric to that of their own to the desired degree. In the present instance, however, the axis of rotation 103, while eccentric to the axis 104 of the coils, is parallel thereto rather than being at an angle thereto, as in the embodiment of Fig. 20. The axis 103 corresponds with that of the shaft 94$^b$ from an operating motor (not shown).

While being turned, the coils 92$^b$ and 93$^b$ receive alternating current through slip rings 96$^b$ and 97$^b$ and the respective contacts 98$^b$ and 99$^b$. When these coils are stationary and they exert a levitating force on the conductive object 101$^b$ tending to support it on the axis 104 of said coils. When rotated, however, this axis revolves in a circle about the axis 103 and the line of stable support shifts to the center of said circle, so that the object 101$^b$ is supported, or tends to be supported, on the axis 103 as illustrated. The advantage of revolving the coils about said axis 103 is, as in the preceding embodiment, to reduce the effect of the normally weak center in an otherwise coaxial coil field so that the conductive object 101$^b$ may be supported more efficiently even when molten without any difficulty. In all embodiments, involving mechanical rotation of field-producing coils, the speed of rotation should be sufficiently high that inertia prevents the body being heated from following the motion of the coil axis.

It is in the range of this invention to include electrical, rather than mechanical methods as illustrated by Figures 20 and 21, for producing the desired scanning fields described in connection with these figures.

Referring now to the embodiment of our invention illustrated in Figure 23, there is shown apparatus for continuously manufacturing drawn metal of the character previously discussed. The matter initially passes from a machine (not shown) for extruding a rod 54, which then passes through rolls 55. The rod 54 may be formed of powdered refractory metal held together by means of a binder, such as paraffin or other suitable material, so that it stays together until treated to provide metal having the desired coherence.

The extruded rod 54 first passes through a preheating zone formed by a coil 56 carrying high frequency current to inductively heat said rod and bake the particles thereof into a fairly coherent state, at the same time eliminating the binder.

The metal rod 54 after preheating passes into the influence of coils 23$^f$ and 22$^f$, which may correspond with those numbered 23 and 22 of Figures 1 to 6, inclusive. When under the influence of these coils which, as in the illustrated embodiment, carry high frequency current, the rod is further heated, and if desired the heating may be carried on at least to incipient melting, the melted material at the same time being held back by the field produced by the coils 22$^f$ and 23$^f$, so that it assumes the bulbular shape designated 26$^f$.

As the melting material passes out below the lower turn of the coil 22f, it may be constricted in diameter, by the field, as illustrated, and from there pass through a cooling zone caused by a device 57 of any desired character. Below the cooling device, rolls 58 may draw the rod on to finally reach drawing dies (not shown).

From the above discussion, it will be seen that we propose to use our invention for treating pressed powdered metal, or for that matter, any metal formed as a rod in a continuous manner, by first passing through a preheating zone, then through a melting zone where high frequency coils act in accordance with our invention to temporarily support the metal while being melted, said metal being thereafter passed through a cooler on its way to drawing dies, if it is desired, to form wire, or it may be used in consolidated condition immediately after passing through to the cooler.

Referring now to the embodiment of our invention illustrated in Figure 24, there is shown apparatus for feeding pressed metal powder in the form of spheres or right circular cylindrical slugs 26g, one by one through high frequency coils where such slugs are melted and then allowed to flow or drop into molds where they are cast into "pigs" or other desired forms. The slugs or spheres 26g may be formed in any desired manner as by mixing the powder with a binder, such as paraffin, and pressing to size and shape desired. These slugs 26g are fed through an incline tube 59, to a vertical tube 61.

This vertical tube has a side opening 62 with which the lower end of the tube 59 registers, and a spring-actuated gate 63 which normally lies to the inclined position illustrated, and receives one of the pressed slugs 26g thereon. The actuating spring 64 is sufficiently strong so that said slug is supported in the position illustrated. The other side of the tube 61 is desirably notched or punched out, as indicated in 65, so that a stop 66 is provided for the gate 63.

A hollow plunger 67, reciprocating in the tube 61 above the gate 63, is connected to a source of vacuum (not shown). Upon downward movement to engage with a slug 26g therebeneath, it holds said slug by suction and, upon further movement, pushes the gate 63 down to vertical position. It finally leaves said slug in the position designated 68, that is, where it is levitated by the alternating field produced by the coils 22g and 23g, corresponding with those designated 22 and 23 in the first embodiment.

The vacuum on the plunger 67 is then released, leaving the slug supported at 68 by the alternating current field referred to as the levitating region and said plunger returns upward beyond the position shown in full lines in Figure 13, to allow the next slug to roll down on the supporting gate 63 for a repetition of the process. In the meantime the slug 68, is melted and by a decrease in the field strength produced by the coils 22g and 23g, it is thereupon allowed to flow under control or drop into a mold 69 therebeneath, casting to a desired form. In the present embodiment each mold 69 is one of a series carried by a chain 71 passing over a sprocket 72 carried by shaft 73, so that the casting process may be continuous. It is also within the province of this invention to include introduction of loose powder conductive material into the levitating region, if so desired.

From the foregoing, it will be seen that we propose to form slugs of pressed metal powder held together by a binder, move said slugs, one by one, into the influence of a levitating and heating high frequency magnetic field, and after melting, allow to flow under control or drop into a mold to be cast to a desired form. It is also contemplated to have the movement of molds for receiving such molten metal intermittent and synchronized with the dropping of the molten metal thereinto, so that each slug is first, rolled down an inclined tube; second, engaged by suction plunger in a vertical connecting tube; third, moved down by said plunger into the influence of levitating and heating high frequency magnetic field; fourth, melted while in said field; and fifth, allowed to flow under control or dropped into a registering mold therebeneath.

In all forms but that of the first embodiment, the melting or heating of the metal is shown for simplicity in unenclosed coils. However, it will be understood that we contemplate in all forms of our invention, where desired effecting said melting in a protective atmosphere of vacuum, either in the manner disclosed in Figures 1 to 4 inclusive, or in any other desirable way which will occur to those skilled in the art.

It is also within the province of this invention to include some instances where heating and melting may be effected by coils separate from those which create the levitation and with electrical power of frequency the same or different from that producing said field. The heating may take place in the atmosphere without protection against oxidation, as when melting material which is either not readily oxidized or in which oxidation is not undesirable. It is also understood that in all forms the supporting and/or heating coils are desirably cooled by passing water therethrough.

Although preferred embodiments of our invention have been disclosed, it will be understood that modifications may be made within the spirit and scope of the appended claims.

We claim:

1. The method of levitating and heating electrically conductive materials, comprising shaping a quantity of a selected material, moving it into the influence of a levitating alternating magnetic field, and making the power supplied to said field such that the material is heated to the desired extent while held out of contact with any physical supporting means.

2. The method of levitating and heating electrically conductive materials, comprising shaping a quantity of a selected material, generating an upwardly-expanding alternating magnetic field, moving said material to a position above the means generating said field and in the levitating influence thereof whereby it is levitated and held out of contact with any physical supporting means, and sufficiently increasing the power supplied to said field so that said material is heated to the desired extent.

3. The method of levitating and heating electrically conductive materials, comprising shaping a quantity of a selected material, generating opposed levitating alternating magnetic fields one above another, moving said material to a position between said fields and in the levitating influence thereof, and sufficiently increasing the power supplied to said fields so that the material is heated to the desired extent while held out of contact with any physical supporting means.

4. The method of levitating and heating electrically conductive materials, comprising shaping a quantity of a selected material, generating a plurality of alternating magnetic fields, said fields being out of phase with respect to one another so that an effect of rotation is produced with respect to said fields, moving said material to a position in the influence of said fields whereby it is levitated, and sufficiently increasing the power supplied to said fields so that said material is heated to the desired extent.

5. The method of levitating and heating electrically conductive materials comprising forming and shaping a quantity of selected material, generating opposed levitating magnetic fields as three pairs, the axis of one of said pairs being vertical, that of the second horizontal, and that of the third horizontal but at an angle of 90° with respect to said second field, and energizing said fields so that one of the horizontal fields assists, while the other opposes, said vertical fields, moving said material to a position within the influence of said fields whereby it is levitated, and sufficiently increasing the power supplied to said fields so that said material is heated to the desired extent.

6. The method of working metal comprising mixing said metal in powdered form with a binder, extruding said binder-mixed metal down through a pre-heating zone, then through a heating zone comprising at least one levitating alternating magnetic field, whereby said material is melted and temporarily supported in globular form, removing said molten metal continuously from the bottom of said melted mass through cooling means, and finally drawing said material to the desired form.

7. The method of melting and casting refractory metal as a continuous process, comprising briquetting said metal in powdered form into slugs, allowing said slugs to move down an incline to a position in the levitating influence of an alternating magnetic field, removing said supporting means, leaving a slug in said field, applying such power to said field to cause said slug to melt, receiving the material of said slug as it melts in an indexed mold therebeneath, and continuing said process, catching the material of each succeeding melted slug in a succeeding indexed mold.

8. Apparatus for levitating, heating and melting electrically conductive materials, comprising a coil having a substantially vertical axis, means for supplying alternating current to said coil to generate a levitating magnetic field, and means for moving a conductive object to a position on said axis, above said coil, and in the influence of said field, whereby it may be levitated while heated to the desired extent while held out of contact with any physical supporting means.

9. Apparatus for levitating, heating, and melting electrically conductive materials, comprising a plurality of isolated coils with a common axis and disposed one above another, means for supplying alternating current to said coils, to generate opposing levitating magnetic fields therebetween, and means for moving said object to a position between said coils, on their axis, and in the influence of said fields, whereby it may be levitated and held out of contact with any physical supporting means while heated to the desired extent.

10. Apparatus for levitating, heating, and melting electrically conductive materials, comprising a plurality of isolated coaxial coils with a substantially vertical axis and disposed one above another, means for supplying high frequency power to said coils to generate opposing magnetic fields therebetween, means providing a protective atmosphere around said object, and means for moving said object into the influence of said fields, whereby it may be levitated between said coils at their common axis and held out of contact with any physical supporting means while being heated to the desired extent.

11. Apparatus for levitating, heating and melting electrically conductive materials, comprising a conductive tube helically coiled to upwardly frusto-conical form, means for supplying alternating current to said coil to generate a levitating magnetic field thereabove, means for internally cooling the turns of said coils, and means for moving a conductive object up into the influence of said field, whereby it may be levitated and held out of contact with any physical supporting means while heated to the desired extent.

12. Apparatus for levitating, heating, and melting electrically conductive materials, comprising a conductive tube spirally coiled, and with turns thereof lying in a generally horizontal plane, another similar tube spirally coiled coaxial therewith, having an outside diameter smaller than that of said first-mentioned coil, and lying in a plane thereabove, means for supplying alternating current to said coils in series to generate opposed levitating alternating magnetic fields, and means for moving a conductive object to a position between said coils, on the axis thereof, and in the influence of said fields, whereby it may be levitated while heated to the desired extent.

13. Apparatus for levitating, heating and melting electrically conductive materials, comprising a conductive tube helically coiled to upwardly expanding frusto-conical form; a similar tube spirally coiled with its turns lying in a plane over said first tube and coaxial therewith, means for supplying alternating current to said coils in series to generate a levitating magnetic field therebetween, and means for moving a conductive object to a position on the axis of said coils in the influence of said field, whereby it may be levitated while heated to the desired extent.

14. Apparatus for levitating, heating, and melting electrically conductive materials, comprising a conductive tube helically coiled with its axis extending vertically; a similar tube helically coiled to a smaller diameter, disposed above said first-mentioned tube, and coaxial therewith, means for supplying alternating current to said coils in series to generate opposed alternating magnetic fields therebetween, and means for moving a conductive object to a position on said axis between said coils and in the influence of said fields, whereby it may be levitated while heated to the desired extent.

15. Apparatus for levitating, heating, and melting electrically conductive materials, comprising three pairs of spaced coaxial helically coiled conductive tubes, one of said pairs having a substantially vertical axis, another a substantially horizontal axis, and a third a substantially horizontal axis perpendicular to that of said second pair of tubes, means for supplying alternating current to said coils to generate levitating magnetic fields therebetween, and means for moving a conductive object into the influence of said fields, whereby it may be levitated while heated to the desired extent.

16. Apparatus for continuously treating a rod of metal, comprising means for extruding said metal in powdered form mixed with a binder, a coil therebeneath coaxial therewith for receiving said rod and pre-heating it, at least one coil beneath said first coil, coaxial therewith, through which said preheated rod passes along its axis, means for supplying power to said second coil to produce a levitating alternating magnetic field for continuously heating said preheated rod to the melting point, and means for drawing through cooling means therebeneath material from said rod as it melts.

17. Apparatus for casting refractory metal, comprising means for forming pressed slugs of said metal in powdered form, an inclined guide along which said slugs move, a vertical tube having a side opening receiving slugs from said guide, a gate spring-actuated and temporarily supporting said slugs, one at a time, in said vertical tube, suction means reciprocable in said vertical tube for periodically moving said slugs, one at a time, from temporary support on said gate to a point below the lower end of said vertical tube, a levitating coil beneath said vertical tube, means supplying alternating current to said coil to produce an alternating field serving to levitate, heat and melt each slug as it is moved down from said vertical tube, and molds indexing one by one beneath said vertical tube, so that the material of each slug, as melted, is cast into one mold and moved on by it to allow the next mold to receive the material of the next slug after melting.

18. Apparatus for levitating, heating, and melting electrically conductive materials, comprising a conductive tube helically coiled with its axis extending vertically, a similar tube helically coiled to a smaller diameter, disposed above said first mentioned tube and coaxial therewith, means for supplying alternating current to said coils in series, to generate opposed alternating magnetic fields therebetween, and a low-loss refractory element movable on said axis, whereby the melting of a conductive object between said fields may be controlled.

19. Apparatus for levitating, heating, and melting electrically conductive materials, comprising a plurality of isolated coils with a common axis, means for supplying alternating current to said coils to generate opposed levitating magnetic fields therebetween, and means for moving said coils about an axis offset with respect to said common axis, whereby a conductive object in the influence of said fields, may be levitated while heated to the desired extent.

20. Apparatus for levitating, heating and melting electrically conductive materials, comprising a coil having a substantially vertical axis, a base for said apparatus, means for supplying alternating current to said coil to generate a levitating magnetic field, means passing through said base coaxial with said coil for moving a conductive object to a position on the axis of said coil in the influence of said field, whereby it may be levitated while heated to the desired extent, said means comprising a cup formed of low loss material, a rod passing through said base and on the upper end of which said cup is supported, the lower end of said rod beneath said base carrying an armature, a cylinder mounted on the lower surface of said base in which said rod and its armature are reciprocably mounted, a solenoid surrounding said cylinder, means for energizing and deenergizing said solenoid to effect operation of said cup through said rod, means mounted on said base for enclosing said levitating apparatus, and a pipe connected to an aperture in said base beneath said enclosing means for evacuating the space thereunder or supplying a protective atmosphere to said coil.

21. Apparatus for levitating, heating and melting electrically conductive materials comprising a plurality of isolated coils each with a substantially vertical axis and disposed one above another, a base for said apparatus, means for supplying alternating current to said coils to generate opposed levitating magnetic fields therebetween, means passing through said base coaxial with said coils for moving a conductive object to a position on the axis of said coils in the influence of said fields, whereby it may be levitated while heated to the desired extent, said means comprising a cup formed of low-loss material, a rod passing through said base and on the upper end of which said cup is supported, the lower end of said rod beneath said base carrying an armature, a cylinder mounted on the lower surface of said base and in which said rod and its armature are reciprocably mounted, a solenoid surrounding said cylinder, means for energizing and deenergizing said solenoid to effect operation of said cup through said rod, means mounted on said base for enclosing said levitating apparatus, and a pipe connected to an aperture in said base beneath said enclosing means for evacuating the space thereunder or supplying a protective atmosphere to said coils.

References Cited in the file of this patent

UNITED STATES PATENTS

| Number | Name | Date |
| --- | --- | --- |
| 1,676,926 | Rentschler et al. | July 10, 1928 |
| 1,697,811 | Dailey | Jan. 1, 1929 |
| 2,036,034 | Fulmer et al. | Mar. 31, 1936 |
| 2,060,858 | Flynt | Nov. 17, 1936 |
| 2,217,228 | Macksond | Oct. 8, 1940 |
| 2,301,456 | Sabine | Nov. 10, 1942 |
| 2,345,871 | Hallberg | Apr. 4, 1944 |
| 2,363,741 | Montgomery | Nov. 28, 1944 |
| 2,394,727 | Taylor | Feb. 12, 1946 |
| 2,471,128 | Stein | May 24, 1949 |
| 2,513,778 | Bailey | July 4, 1950 |
| 2,525,336 | Bierwirth | Oct. 10, 1950 |
| 2,535,335 | Thevenin | Dec. 26, 1950 |
| 2,538,979 | Parage | Jan. 23, 1951 |
| 2,548,897 | Kroll | Apr. 17, 1951 |
| 2,551,358 | Andren | May 1, 1951 |
| 2,584,660 | Bancroft | Feb. 5, 1952 |